(12) United States Patent
Bieberdorf

(10) Patent No.: US 7,134,764 B1
(45) Date of Patent: Nov. 14, 2006

(54) AIRPORT LIGHT SYSTEM

(76) Inventor: Roger Bieberdorf, 3060 N. Ridgecrest #115, Mesa, AZ (US) 85207

( * ) Notice: Subject to any disclaimer, the term of this patent is extended or adjusted under 35 U.S.C. 154(b) by 0 days.

(21) Appl. No.: 10/981,160

(22) Filed: Nov. 4, 2004

(51) Int. Cl.
*F21L 4/00* (2006.01)

(52) U.S. Cl. ............... 362/183; 362/153; 362/812; 40/564

(58) Field of Classification Search ............ 362/183, 362/153, 153.1; 40/564, 606.13
See application file for complete search history.

(56) References Cited

U.S. PATENT DOCUMENTS

| | | | |
|---|---|---|---|
| 4,879,965 A * | 11/1989 | Valley | 116/209 |
| 5,768,814 A * | 6/1998 | Kozek et al. | 40/570 |
| D403,263 S * | 12/1998 | Giardini et al. | D10/114 |
| 6,946,975 B1 * | 9/2005 | Hansler et al. | 340/947 |
| 2004/0216343 A1 * | 11/2004 | Golding | 40/564 |

* cited by examiner

*Primary Examiner*—Renee Luebke
*Assistant Examiner*—Zahra I Bennett
(74) *Attorney, Agent, or Firm*—Parsons &Goltry; MichaeelW. Goltry; Robert A. Parsons

(57) ABSTRACT

An airport light system is disclosed, which includes an airport guidance sign circuit, and an airport light installation coupled to the airport guidance sign circuit that includes a guidance sign component activated in an ON position of the airport guidance sign circuit and deactivated in an OFF position of the airport guidance sign circuit, a runway guard light component, a rechargeable battery coupled to the runway guard light, a battery charger for recharging the rechargeable battery, and the runway guard light component activated a) by the airport guidance sign circuit in the ON position of the airport guidance sign circuit, and b) by the rechargeable battery in the OFF position of the airport guidance sign circuit.

21 Claims, 5 Drawing Sheets

AIRPORT LIGHT SYSTEM

FIELD OF THE INVENTION

The present invention relates to airport light systems and installations.

BACKGROUND OF THE INVENTION

Modern airports incorporate specialized lighting systems including, for instance, runway touchdown zone lighting systems, runway centerline lighting systems, taxiway centerline lighting systems, and edge lighting systems. Edge lighting systems are important because they help to define runways and taxiways and inhibit pilots from inadvertently driving their airplanes off the designated runway and taxiway areas.

Two of the most important types of lighting fixtures of airport lighting systems are guidance signs, and runway guard lights. Guidance signs are used on airport taxiways to mark taxi routes and intersections. Guidance signs are provided in different colors, including black-on-yellow, yellow-on-black, or white-on-red. The color of a guidance sign depends on the application of the guidance sign as defined by applicable governing standards. A runway guard light is an elevated or in-pavement flashing yellow light fixture that provides distinctive warnings to pilots that they are approaching a runway holding position and are about to enter an active runway.

Guidance signs operate at night, and during periods of poor visibility, such as during bad weather and during foggy conditions. During daylight hours when visibility is not impaired due to poor weather conditions, the internal lighting of guidance signs is turned OFF in order to save on electrical and maintenance costs. Moreover, governing standards do not require guidance signs to be operational during daylight hours when visibility is not impaired due to poor weather conditions. However, runway guard lights must be operational at all times as required by applicable governing standards.

Guidance signs of airport lighting systems are wired electrically in series with a guidance sign circuit, which may include a dedicated guidance sign circuit, a taxiway edge circuit, or a runway edge light circuit. In order for the runway guard light to operate in times of good visibility when the runway edge or taxiway edge circuits are turned OFF, runway guard lights of airport lighting systems are also wired electrically in series with a runway guard light circuit. The electrical wiring of a guidance sign circuit providing electrical power to guidance signs is separate from the electrical wiring of the runway guard light circuit providing electrical power to the runway guard lights. This is important and currently required due to the different operational characteristics of guidance signs and runway guard lights. In particular, runway guard lights must not be turned off. Guidance signs can be turned OFF manually, such as by the air traffic controllers in the air traffic control center or tower, or automatically, such as by a timer or photocell. If runway guard lights were connected to the same electrical infrastructure as the guidance signs, the runway guard lights could accidentally be turned OFF due to operator error or a systematic error, which could lead to disastrous results.

Although it is important and currently necessary for guidance signs and runway guard lights to have their own electrical wiring infrastructure, wiring an airport with separate guidance sign and guard light electrical wiring infrastructures is very expensive, difficult, and time consuming. Also, the cost of the electricity required to constantly power runway guard lights is also very expensive.

SUMMARY OF THE INVENTION

In accordance with the principle of the invention, an airport lighting system is disclosed which includes an airport guidance sign circuit, an airport light installation coupled to the airport guidance sign circuit including a guidance sign component activated in an ON position of the airport guidance sign circuit and deactivated in an OFF position of the airport guidance sign circuit, a runway guard light component, a rechargeable battery coupled to the runway guard light, and a battery charger for recharging the rechargeable battery, wherein the runway guard light component is activated a) by the airport guidance sign circuit in the ON position of the airport guidance sign circuit, and b) by the rechargeable battery in the OFF position of the airport guidance sign circuit. The battery charger is coupled to the airport guidance sign circuit, and is activated by the airport guidance sign circuit in the ON position thereof for recharging the rechargeable battery. The installation also includes a solar panel coupled to the battery charger for generating electricity and activating the battery charger in response to exposure to sunlight. The guidance sign component is preferably affixed to the runway guard light component. In a particular embodiment, the guidance sign component marks an airport intersection. In another embodiment, the guidance sign component marks an airport taxi route.

Another embodiment of an airport light system includes an airport guidance sign circuit, a runway guard light component coupled to the airport guidance sign circuit, a rechargeable battery coupled to the runway guard light, and a battery charger for recharging the rechargeable battery, wherein the runway guard light component is activated a) by the airport guidance sign circuit in an ON position of the airport guidance sign circuit, and b) by the rechargeable battery in an OFF position of the airport guidance sign circuit. A guidance sign component is coupled to the airport guidance sign circuit, is affixed to the runway guard light component, and is activated in the ON position of the airport guidance sign circuit and deactivated in the OFF position of the airport guidance sign circuit. The battery charger is coupled to the airport guidance sign circuit, and is activated by the airport guidance sign circuit in the ON position thereof for recharging the rechargeable battery. A solar panel is coupled to the battery charger for generating electricity and activating the battery charger in response to exposure to sunlight. In a particular embodiment, the guidance sign component marks an airport intersection. In another embodiment, the guidance sign component marks an airport taxi route.

Yet another embodiment of an airport light system includes an airport light fixture, adapted to be coupled to an airport guidance sign circuit, including a guidance sign component, a runway guard light component, a rechargeable battery coupled to the runway guard light for providing the runway guard light component with backup power, and a battery charger for recharging the rechargeable battery. The battery charger is adapted to be coupled to the airport guidance sign circuit. A solar panel is coupled to the battery charger for generating electricity and activating the battery charger in response to exposure to sunlight. In a particular embodiment, the guidance sign component marks an airport intersection. In another embodiment, the guidance sign component marks an airport taxi route.

Yet still a further embodiment of an airport light system includes an airport guidance sign circuit, and an airport light installation coupled to the airport guidance sign circuit including a guidance sign component marking an intersection and activated in an ON position of the airport guidance sign circuit and deactivated in an OFF position of the airport guidance sign circuit, a runway guard light component marking a runway holding position adjacent to the intersection, a rechargeable battery coupled to the runway guard light, and a battery charger for recharging the rechargeable battery, wherein the runway guard light component is activated a) by the airport guidance sign circuit in the ON position of the airport guidance sign circuit, and b) by the rechargeable battery in the OFF position of the airport guidance sign circuit. The battery charger is coupled to the airport guidance sign circuit, and is activated by the airport guidance sign circuit in the ON position thereof for recharging the rechargeable battery. A solar panel is coupled to the battery charger for generating electricity and activating the battery charger in response to exposure to sunlight. The guidance sign component is affixed to the runway guard light component.

Consistent with the foregoing summary of preferred embodiments of the invention and the ensuing specification, which are to be taken together, the invention also contemplates associated apparatus and method embodiments.

BRIEF DESCRIPTION OF THE DRAWINGS

Referring to the drawings.

DETAILED DESCRIPTION OF A PREFERRED EMBODIMENT

Figure 1:
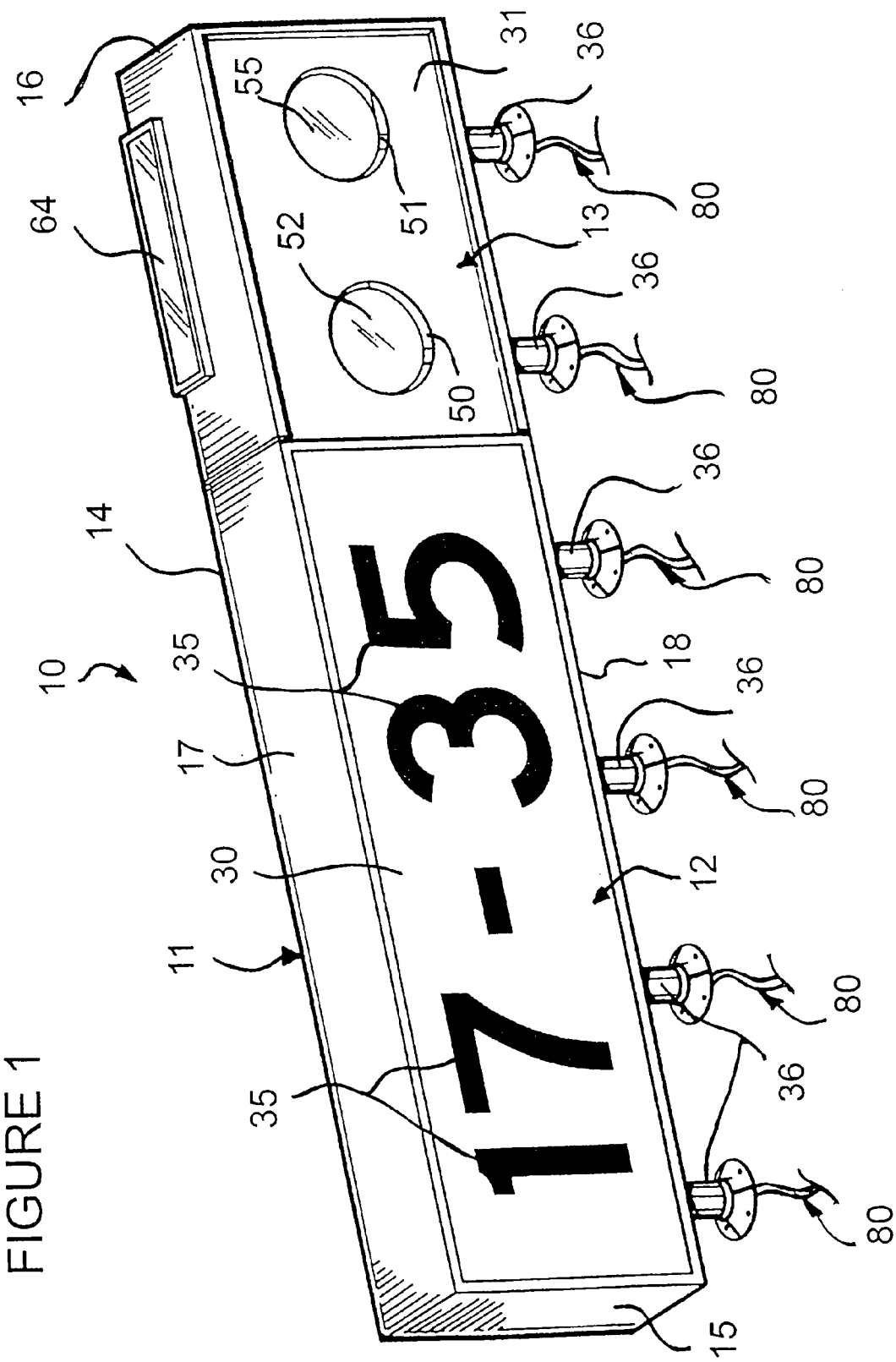
FIG. 1 is an isometric view of an airport light installation including a guidance sign component and a runway guard light component, in accordance with the principle of the invention.
Figure 4:
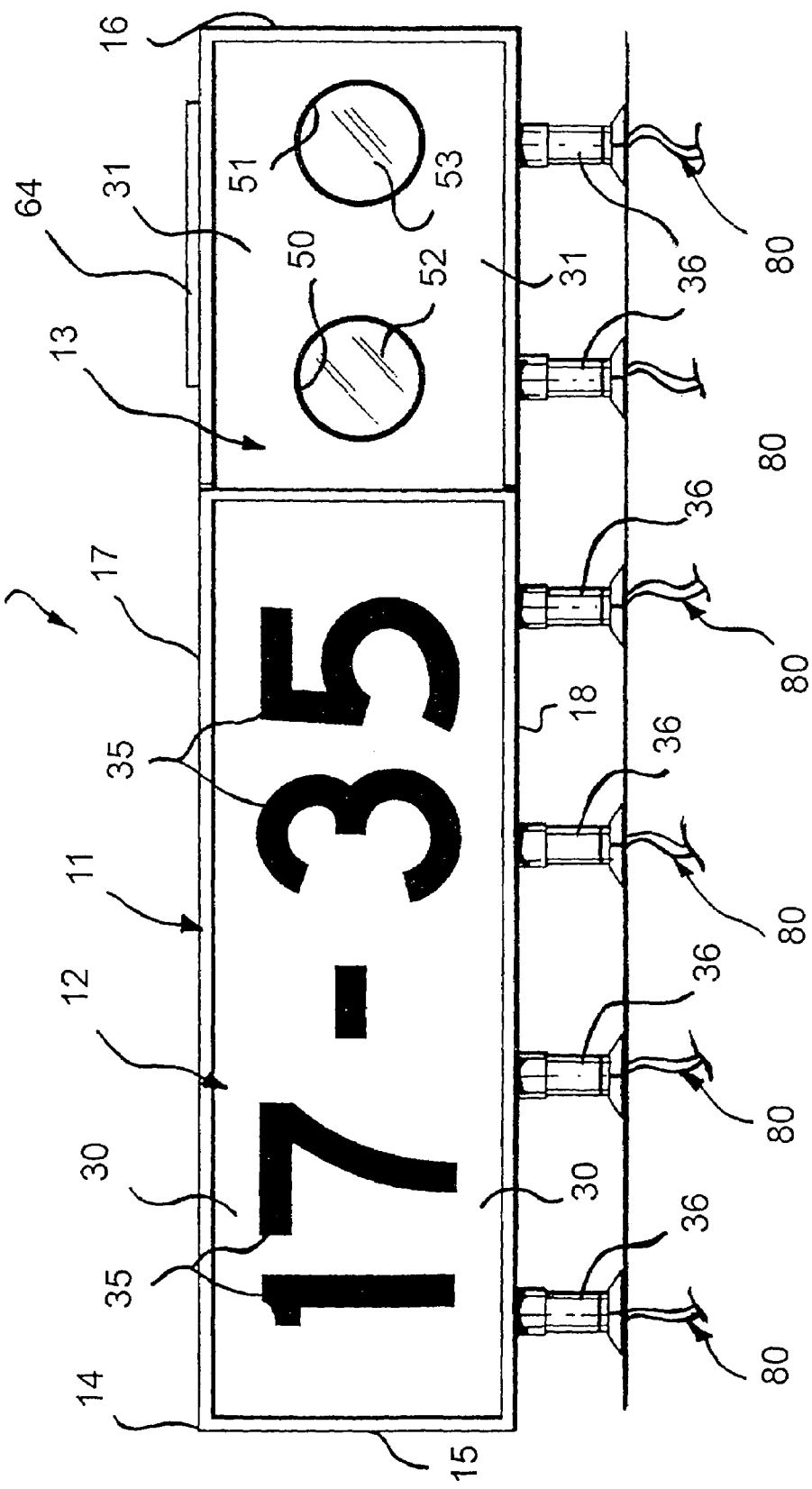
FIG. 4 is a front elevational view of the airport light installation of FIG. 1.

Turning now to the drawings, in which like reference characters indicate corresponding elements throughout the several views, attention is first directed to FIGS. 1 and 4, in which there is seen an airport light system including an airport light installation 10 consisting of a light fixture 11 including a guidance sign component 12 and a runway guard light component 13, which are maintained and held by a housing 14 having opposing ends 15 and 16, a top 17, and an opposing bottom 18. Housing 14 is fashioned of stainless steel, aluminum, titanium, plastic, fiberglass, or other material or combination of materials resistant to long-term exposure to rain, snow, heat, cold, sunlight, and other external influences. Housing 14 can be integrally formed, fashioned of a single piece of material, or fashioned from a plurality of separate parts rigidly affixed together by welding, gluing, screws, rivets, etc. In a preferred embodiment, housing 14 is a high-strength aluminum extrusion housing.

Housing 14 affixes guidance sign component 12 to runway guard light component 13. If desired, guidance sign component 12 and runway guard light component 13 can be provided as separate, discrete units having their own housings, and which are then secured together, such as by screws, rivets, welding, etc. In accordance with the principle of the invention, guidance sign component 12 can be retrofitted with runway guard light component 13. For the purpose of this disclosure, it will be understood that affixing a separate guidance sign component to a separate runway guard light component forms the light fixture of the instant invention, in which the two housings function as housing 14 when they are affixed to one another. Housing 14 is a structural support, and can take on any form.

Housing 14 supports opposing covers 30 and 31, which are located on one side of housing 14 forming a front face of light fixture 11. Covers 30 and 31 are secured in place to housing 14 with screws, nut-and-bolt assemblies, rivets, channels, brackets, etc. Cover 30 is part of guidance sign component 12, and cover 31 is part of runway guard light component 13.

Figure 2:
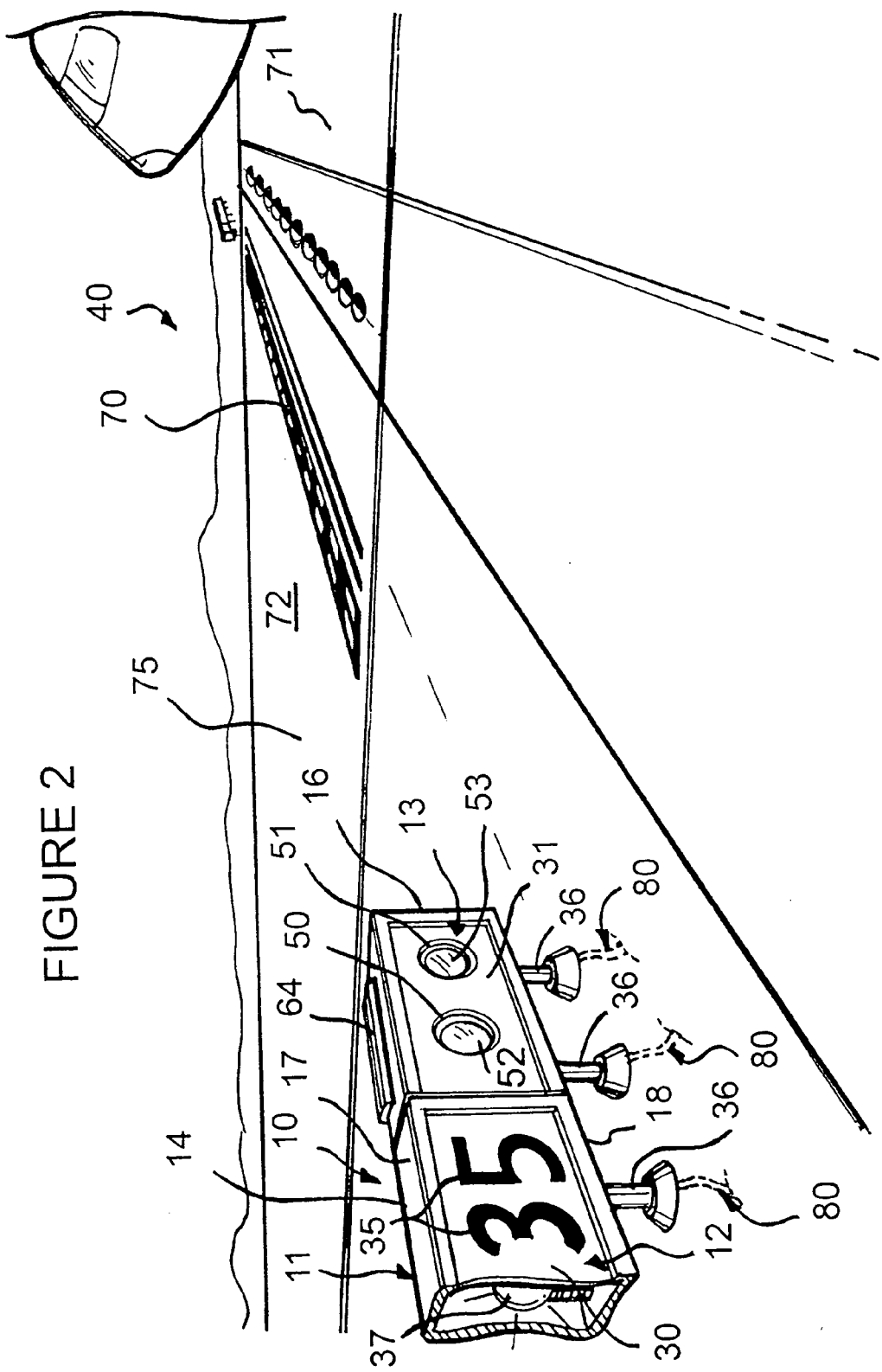
FIG. 2 is a fragmented isometric view of the airport light installation of FIG. 1 shown as it would appear installed at an airport.

Cover 30 is fashioned of a light translucent material, such as light translucent plastic or the like, and has a predetermined color. A message 35 is applied to cover 30, which identifies a section of an airport, such as a taxi route one a particular embodiment of the invention, or an intersection in another embodiment of the invention. As with conventional guidance signs, message 35 can have any number of characters, which will normally depend on the information desired to be conveyed. The cover of guidance sign component 12 has a predetermined message/cover color combination, such as black-on-yellow, yellow-on-black, white-on-red, white-on-black, etc. The message/cover color combination depends on the application of guidance sign component 12 as defined by appropriate governing compliance standards, such as those set forth by the United States Federal Aviation Administration. Guidance sign component 12 includes other conventional features commonly found in conjunction with known airport guidance signs, including, among other things, a specification grade electrical system, one or more lamps maintained in housing 14 behind cover 30 and of the type having a long lamp life, a self-adjusting ballast, and couplings 36 located at bottom 18 for mounting to in-ground airport light base fixtures or containers or as mounted on angle iron stakes or as mounted on a concrete pad/foundation. As matter of example, a lamp 37 of guidance sign component is depicted in FIG. 2, which is a fragmented isometric view of installation 10 shown as it would appear installed at an airport 40. Couplings 36 are preferably breakable couplings in accordance with standard practice.

Guidance sign component 12 is intended to be generally representative of a typical airport guidance sign. Details of guidance sign component 12 not specifically illustrated and described will be readily understood and appreciated by those skilled in the art.

Figure 3:
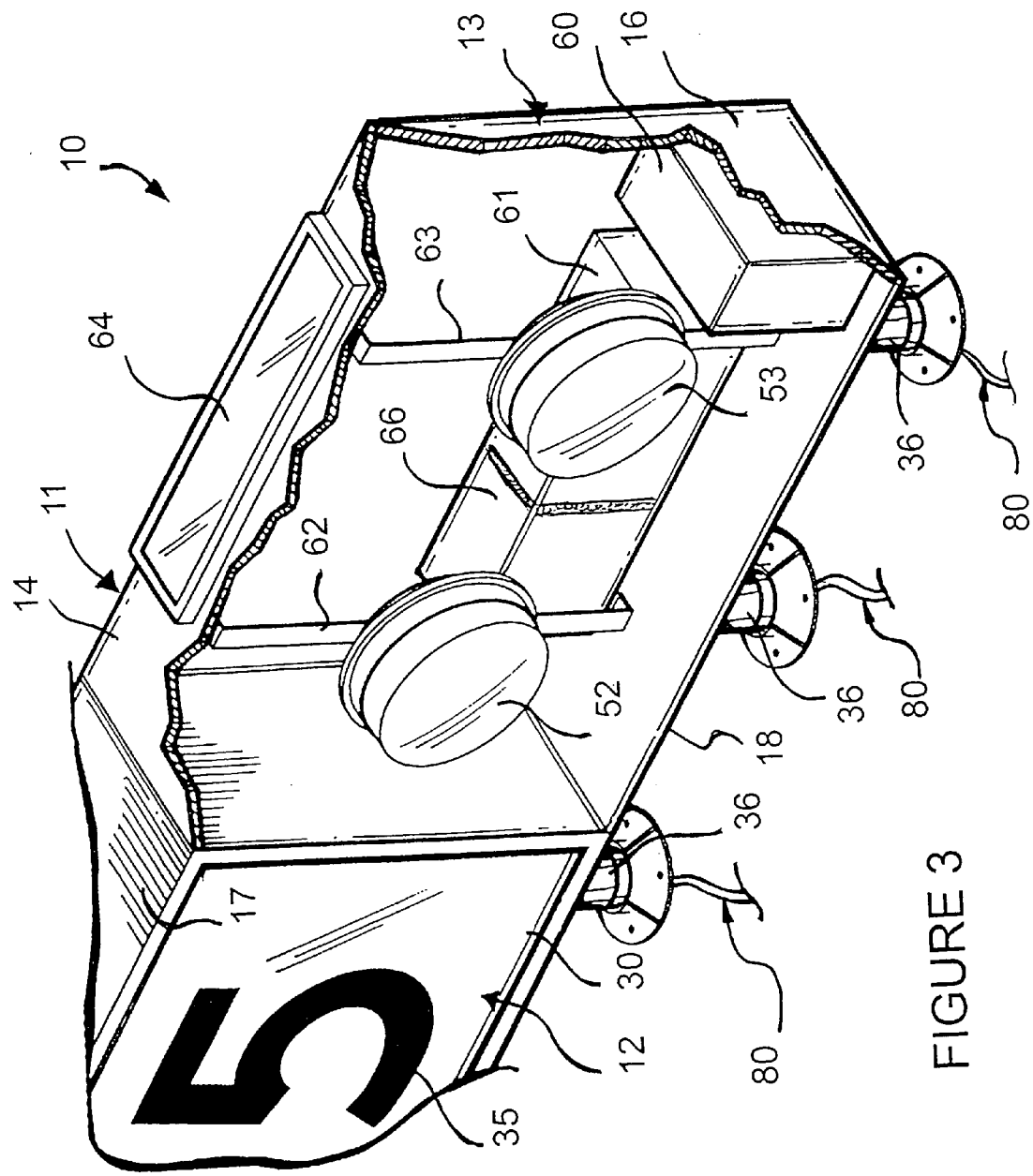
FIG. 3 is a fragmented isometric view of the airport light installation of FIG. 1, with portions of the runway guard light component removed for the purpose of illustration.

Runway guard light component 13 is a flashing light fixture that provides a distinctive warning to pilots that they are approaching a runway holding position and are about to enter an active runway. Considering runway guard light component 13 in conjunction with FIGS. 1 and 4, cover 31, which is fashioned of plastic, aluminum, steel, or the like, has opposing openings 50 and 51 therethrough at which are positioned lamps 52 and 53, respectively. Located in housing 14 behind cover 31 are, as seen in FIG. 3, a rechargeable battery 60, a battery charger 61, a controller 66, and a pair of opposing, parallel uprights 62 and 63 to which are secured lamps 52 and 53, respectively. Lamps 52 and 53 may be fixed or adjustable as to direction in respect to angle of height or lateral aiming. A solar panel 64 is mounted to top 17 of housing 14 at runway guard light component 13, and is disposed exteriorly so as to be capable of accepting sunlight energy and converting it into electricity.

Runway guard light component 13 has a specification grade electrical system (not shown), which electrically couples lamps 52 and 53 to battery 60, battery 60 to battery charger 61 and controller 66, and battery charger 61 to solar panel 64. Runway guard light component 13, like guidance sign component 12, has couplings 36 located at bottom 18 for mounting to in-ground airport light base fixtures, stakes, concrete pad/foundation, etc. It is to be understood that any number of couplings 36 can be used with installation 10. When runway guard light component 13 is activated, lamps 52 and 53 provide alternating flashes at a flash rate of approximately 45–50 alternating flashes per minute. Controller 66 governs the flashing rate of lamps 52 and 53, as is common with known runway guard lights. In accordance with conventional practice, lamps 52 and 53 flash yellow light, but through lamp selection or filters can be made to flash other colors.

Figure 5:
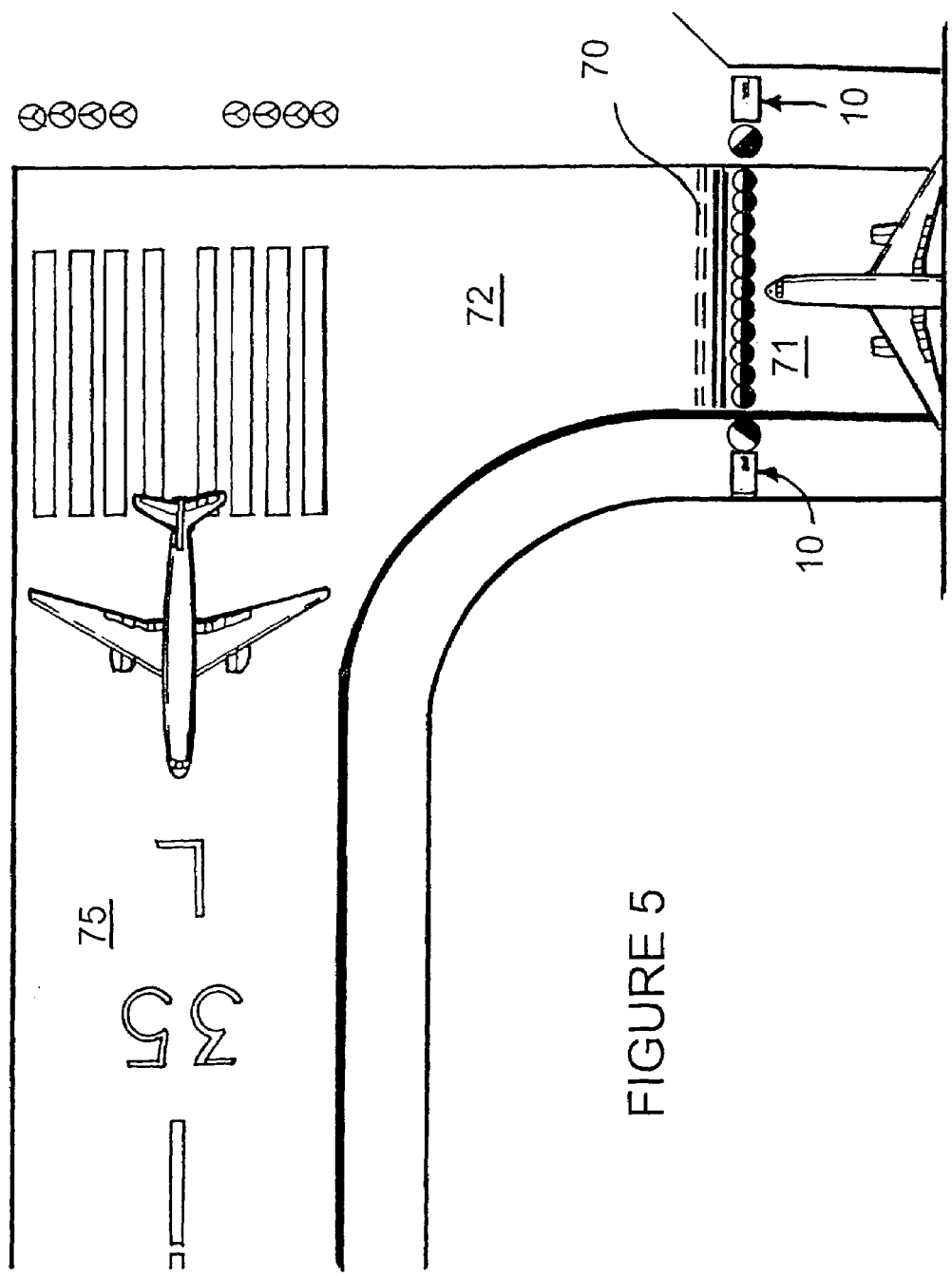
FIG. 5 is a top plan view of an airport runway system illustrating an airport lighting system incorporating airport light installations constructed and arranged in accordance with the invention.

In accordance with the principle of the invention, installation 10 is installed on the side of a hold line 70 for a runway/taxiway 71, as generally illustrated in FIGS. 2 and 5, of a Surface Movement Guidance and Control System (SMGCS) or for a runway entrance control at a controlled or uncontrolled airfield. Guidance sign component 12 identifies taxiway/runway 71, or the intersection 72 of runway 71 with another runway/taxiway 75, and runway guard light component 13 provides a warning to pilots that they are approaching a runway holding position as identified by hold line 70. Couplings 36 are secured to in-ground light base containers (not shown) in a conventional manner, and installation 10 is, in accordance with the principle of the invention, coupled to the airport guidance sign circuit 80 forming part of the airport guidance lighting system of airport 40. Guidance sign circuit 80 can include a dedicated guidance sign circuit, a taxiway edge circuit, a runway edge light circuit, or the like.

In FIGS. 1–4, the electrical wiring of guidance sign circuit 80 is shown associated with each coupling 36, and is coupled electrically to the electrical systems of guidance sign component 12 and runway guard light component 13. Typically, the wiring of guidance sign circuit 80 passes through couplings 36 and is electrically coupled to the electrical systems of components 12 and 13. If desired, the electrical wiring of guidance sign circuit 80 can be associated with less that all of couplings 36, if desired, and even one, so long as there is an electrical coupling between guidance sign circuit 80 and components 12 and 13. Any conventional wiring can be used for coupling guidance sign circuit 80 to components 12 and 13.

Guidance sign component 12 operates at night, and during periods of poor visibility, such as during bad weather and during foggy conditions. During daylight hours when visibility is not impaired due to poor weather conditions, guidance sign component 12 is turned off in order to save on electrical and maintenance costs. When guidance sign circuit 80 is turned ON or activated, electrical power is provided to the electrical system of guidance sign component 12 which activates guidance sign component 12. When guidance sign component 12 is activated, it becomes an illuminated display, in which its lamp or lamps are illuminated for illuminating cover 30 making it, and message 35, highly visible. When guidance sign circuit 80 is turned ON or activated, electrical power is also provided to the electrical system of runway guard light component 13 which activates runway guard light component 13. When runway guard light component 13 is activated, controller 66 operates lamps 52 and 53, in which lamps 52 and 53 flash back-and-forth at a flash rate of approximately 45–50 flashes per minute. Power is also supplied to battery charger 61 when guidance sign circuit 80 is ON, which activates it. When battery charger 61 is activated, it charges rechargeable battery 61 with electrical power.

During the operational period in which guidance sign circuit 80 is ON and activating components 12 and 13, battery charger 61 charges battery 60. When the operation of guidance sign component 12 is no longer required, such as during daylight hours, guidance sign circuit 80 is shut OFF (either manually or automatically), which deactivates guidance sign component 12. When guidance sign circuit 80 is turned OFF, battery 60 provides power, i.e., backup power, to controller 66 and lamps 52 and 53 providing uninterrupted operation of runway guard light component 13 until guidance sign circuit 80 is turned back ON, such as at night, reactivating guidance sign component 12, and reactivating battery charger 61 for recharging rechargeable battery 61 so that rechargeable battery 61 has enough power to provide uninterrupted operation of runway guard light component 13 when guidance sign circuit 80 is again turned OFF. The operation of guidance sign circuit 80 can be manual, or automatic, such as with a timer or photocell.

Solar panel 64 is coupled electrically to battery charger 61 with the electrical system of runway guard light component 13. When exposed to sunlight, solar panel 64, which is conventional in nature, converts the energy of sunlight into electrical energy that it provides to battery charger 61 activating it for recharging rechargeable battery 61. Solar panel 64 provides a redundant layer of power backup for runway guard light component 13. When guidance sign circuit 80 is OFF during daylight hours and power is being provided by rechargeable battery 61, solar panel 64 provides battery charger 61 with electrical power, which allows battery charger 61 to continually recharge rechargeable battery during daylight hours when guidance sign circuit is OFF.

The present invention is described above with reference to a preferred embodiment. However, those skilled in the art will recognize that changes and modifications may be made in the described embodiment without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. Apparatus comprising:
    an airport guidance sign circuit;
    an airport light installation coupled to the airport guidance sign circuit, comprising:
        a guidance sign component activated in an ON position of the airport guidance sign circuit and deactivated in an OFF position of the airport guidance sign circuit,
        a runway guard light component,
        a rechargeable battery coupled to the runway guard light component,
        a battery charger for recharging the rechargeable battery, and the runway guard light component activated a) by the airport guidance sign circuit in the ON position of the airport guidance sign circuit, and b) by the rechargeable battery in the OFF position of the airport guidance sign circuit.

2. Apparatus according to claim 1, wherein the battery charger is coupled to the airport guidance sign circuit, and is activated by the airport guidance sign circuit in the ON position thereof for recharging the rechargeable battery.

3. Apparatus according to claim 1, further comprising a solar panel coupled to the battery charger for generating electricity and activating the battery charger in response to exposure to sunlight.

4. Apparatus according to claim 1, wherein the guidance sign component is affixed to the runway guard light component.

5. Apparatus according to claim 1, wherein the guidance sign component marks an airport intersection.

6. Apparatus according to claim 1, wherein the guidance sign component marks an airport taxi route.

7. Apparatus comprising:
an airport guidance sign circuit;
a runway guard light component coupled to the airport guidance sign circuit;
a rechargeable battery coupled to the runway guard light component;
a battery charger for recharging the rechargeable battery; and
the runway guard light component activated a) by the airport guidance sign circuit in an ON position of the airport guidance sign circuit, and b) by the rechargeable battery in an OFF position of the airport guidance sign circuit.

8. Apparatus according to claim 7, further comprising a guidance sign component coupled to the airport guidance sign circuit, affixed to the runway guard light component, and activated in the ON position of the airport guidance sign circuit and deactivated in the OFF position of the airport guidance sign circuit.

9. Apparatus according to claim 8, wherein the guidance sign component marks an airport intersection.

10. Apparatus according to claim 8, wherein the guidance sign component marks an airport taxi route.

11. Apparatus according to claim 7, wherein the battery charger is coupled to the airport guidance sign circuit, and is activated by the airport guidance sign circuit in the ON position thereof for recharging the rechargeable battery.

12. Apparatus according to claim 7, further comprising a solar panel coupled to the battery charger for generating electricity and activating the battery charger in response to exposure to sunlight.

13. Apparatus comprising:
an airport light fixture, adapted to be coupled to an airport guidance sign circuit, including a guidance sign component, and a runway guard light component;
a rechargeable battery coupled to the runway guard light component for providing the runway guard light component with backup power; and
a battery charger for recharging the rechargeable battery.

14. Apparatus according to claim 13, wherein the battery charger is adapted to be coupled to the airport guidance sign circuit.

15. Apparatus according to claim 13, further comprising a solar panel coupled to the battery charger for generating electricity and activating the battery charger in response to exposure to sunlight.

16. Apparatus according to claim 13, wherein the guidance sign component marks an airport intersection.

17. Apparatus according to claim 13, wherein the guidance sign component marks an airport taxi route.

18. Apparatus comprising:
an airport guidance sign circuit;
an airport light installation coupled to the airport guidance sign circuit, comprising:
a guidance sign component marking an intersection and activated in an ON position of the airport guidance sign circuit and deactivated in an OFF position of the airport guidance sign circuit,
a runway guard light component marking a runway holding position adjacent to the intersection,
a rechargeable battery coupled to the runway guard light component,
a battery charger for recharging the rechargeable battery, and
the runway guard light component activated a) by the airport guidance sign circuit in the ON position of the airport guidance sign circuit, and b) by the rechargeable battery in the OFF position of the airport guidance sign circuit.

19. Apparatus according to claim 18, wherein the battery charger is coupled to the airport guidance sign circuit, and is activated by the airport guidance sign circuit in the ON position thereof for recharging the rechargeable battery.

20. Apparatus according to claim 18, further comprising a solar panel coupled to the battery charger for generating electricity and activating the battery charger in response to exposure to sunlight.

21. Apparatus according to claim 18 wherein the guidance sign component is affixed to the runway guard light component.

* * * * *